United States Patent [19]

Rioult

[11] Patent Number: 5,553,687
[45] Date of Patent: Sep. 10, 1996

[54] METHOD FOR ASSEMBLYING AND ADJUSTING A DRUM BRAKE

[75] Inventor: Christian Rioult, Paris, France

[73] Assignee: AlliedSignal Aftermarket Europe, Drancy, France

[21] Appl. No.: 594,480

[22] Filed: Jan. 31, 1996

Related U.S. Application Data

[63] Continuation of Ser. No. 420,271, Apr. 11, 1995, abandoned, which is a continuation-in-part of Ser. No. 252,853, Jun. 2, 1994, abandoned.

[51] Int. Cl.$^6$ .................................................. F16D 65/56
[52] U.S. Cl. .................... 188/79.54; 188/325; 188/382
[58] Field of Search ............................ 188/79.54, 79.57, 188/325, 327, 328, 382; 29/402.08, 469

[56] References Cited

U.S. PATENT DOCUMENTS

| | | | |
|---|---|---|---|
| 3,550,729 | 12/1970 | Underwood | 188/79.57 |
| 3,896,686 | 7/1975 | Swinney | 188/382 X |
| 4,903,800 | 2/1990 | Michoux | 188/79.54 |
| 5,171,000 | 12/1992 | Lapointe et al. | 267/168 X |

OTHER PUBLICATIONS

Renault letter dated 22 Sep. 1993.
Trophe d'or award dated Oct. 25, 1993 from Equip'auto 93 show.
AlliedSignal Aftermarket Europe S. A. memo dated 2 Nov. 1993.
AlliedSignal Aftermarket Europe leaflet L 704 677 (undated).
AlliedSignal Aftermarket Europe advertising brochure Apr.–May 1994.
l'auto–journal brochure Jul. 1994.

*Primary Examiner*—Robert J. Oberleitner
*Assistant Examiner*—Kevin D. Rutherford
*Attorney, Agent, or Firm*—Leo H. McCormick, Jr.

[57] ABSTRACT

The invention relates to a method for assembling and adjusting a drum brake of the type of those which comprise: a backplate (2); two shoes (3, 4); return springs (5, 6) urging these shoes towards one another; a wheel cylinder (7) secured to the backplate; an anchoring unit (8) secured to the backplate; and a strut (9) of adjustable length limiting the degree to which the shoes are brought together. This method includes a first step consisting in preassembling and adjusting a subassembly of the brake comprising the two shoes, the strut, and the return springs, and a removable wedge can be located between the shoes.

1 Claim, 2 Drawing Sheets

METHOD FOR ASSEMBLYING AND ADJUSTING A DRUM BRAKE

This application is a continuation of application(s) Ser. No. 08/420,271 filed on Apr. 11, 1995, now abandoned, which is a CIP of Ser. No. 08/252,853 filed on Jun. 2, 1994, now abandoned.

TECHNOLOGICAL BACKGROUND OF THE INVENTION

The present invention relates to a method for assembling and adjusting a brake of the type of those which use a drum of given inside diameter and which comprise: a backplate; two shoes, each of which exhibits a lower end and an upper end; return springs urging these shoes towards one another; a wheel cylinder secured to the backplate and capable of moving the upper ends of the shoes away from one another; an anchoring unit secured to the backplate, of given width, and on which the lower ends of the shoes rest; and a strut of adjustable length limiting the extent to which the shoes come together.

A brake of this type is described, for example, in U.S. Pat. No. 4,903,800 which is incorporated herein by way of reference.

According to the conventional art, it is common practice to assemble and adjust the whole drum brake at the factory, then to mount the complete brake on the vehicle.

In order to do this, each of the components of the brake is mounted, at the factory, on the backplate, and the backplate is then fixed to the chassis of the vehicle, the wheel cylinder moreover being connected to the hydraulic braking circuit of this vehicle.

Such a method is particularly inappropriate as far as overhauling a brake, already in place on a vehicle, is concerned, not only because some of the components of the brake to be overhauled, and particularly the backplate, are systematically replaced although they have not undergone any wear, but above all because the mounting of a complete brake is a long and tricky operation.

It is already known, in order to alleviate these drawbacks, to replace, when overhauling a brake, only those components which seem worn or most worn.

Such a practice however leads to a significant risk that the overhauled brake might not exhibit optimum operational and safety characteristics owing to the difficulties that the separate mounting of the components of the brake on the backplate when the latter is secured to the vehicle, and the adjustment of the brake thus mounted involve.

SUMMARY OF THE INVENTION

The present invention relates to a method for assembling and adjusting a dram brake, which makes it possible to reduce the time required for mounting the brake, to simplify the mounting operation, and to guarantee the performance of the brake thus mounted.

To this end, the method of the invention comprises a first step consisting in preassembling and adjusting a subassembly of the brake, and comprising the operations consisting in:

placing the two brake shoes on a surface;

locating the said adjustable-length strut between the shoes;

adjusting the length of the strut to a value for which the shoes are separated by a maximum diametral distance which is less than the inside diameter of the drum; and fastening the return springs to the shoes.

Preferably, the first step further comprises the operation consisting in locating between the shoes, at a distance from the strut, a removable wedge the length of which is such that a stress is applied to the return springs.

DESCRIPTION OF THE PREFERRED EMBODIMENT

Figure 1:
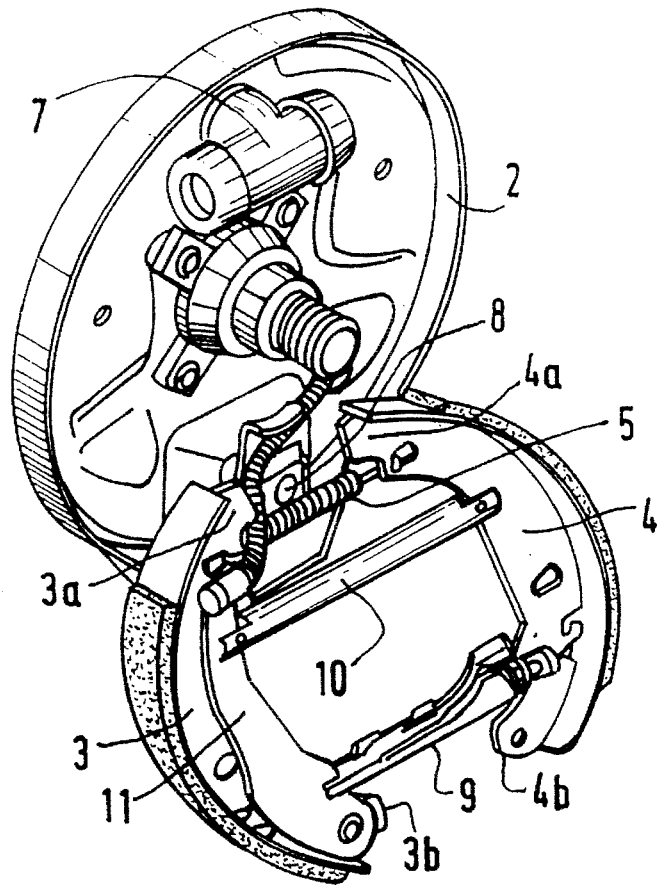
FIG. 1 is a perspective view of a drum brake subassembly prepared according to the first step of the invention, and during mounting of this brake on the backplate, installed on the vehicle.
Figure 2:
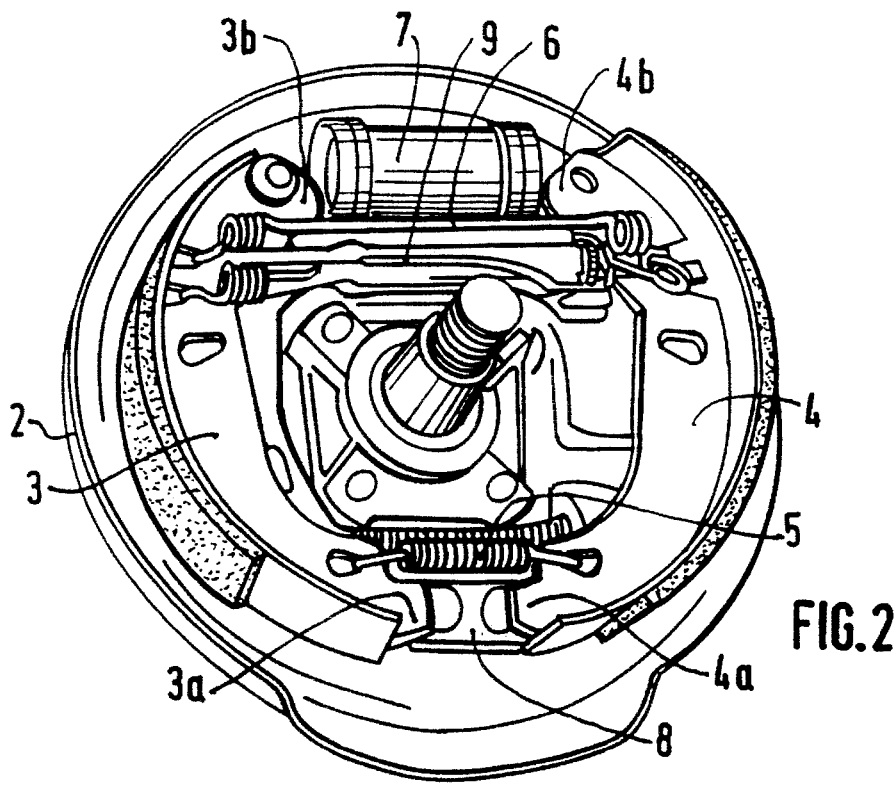
FIG. 2 is a perspective view similar to FIG. 1, and representing a more advanced mounting stage.
Figure 3:
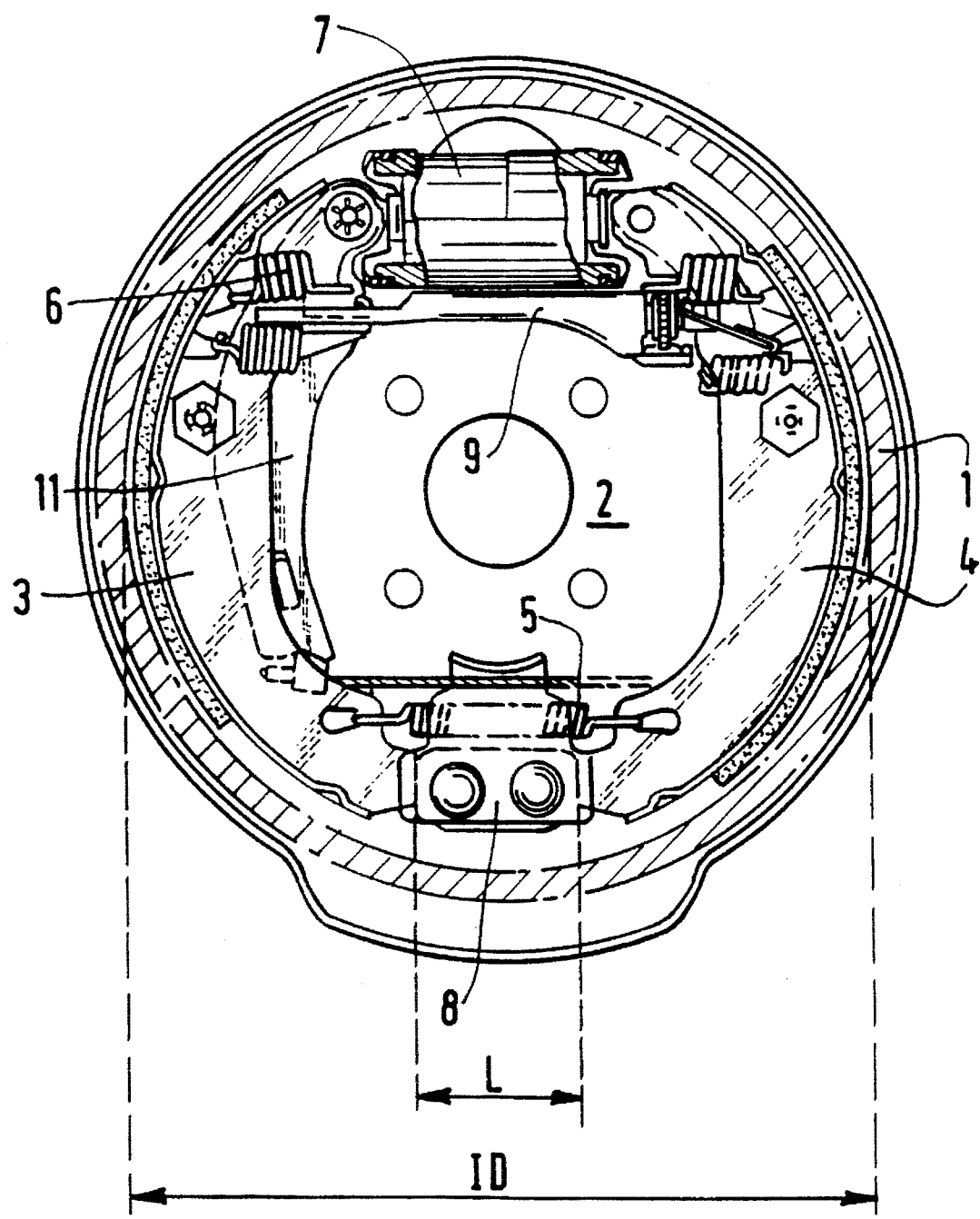
FIG. 3 is a front-on view of a brake of the type of those to which the method of the invention applies, once mounting thereof is finished.

The invention relates to brakes of the type of those which use a drum 1, of given inside diameter ID (FIG. 3), and which comprise: a backplate 2 (FIGS. 1 and 2); two shoes 3, 4, each of which exhibits a lower end such as 3a, 4a and an upper end such as 3b, 4b; return springs 5, 6 urging these shoes 3, 4 towards one another; a wheel cylinder 7 secured to the backplate 2 and capable of moving the upper ends 3b, 4b of the shoes 3 and 4 away from one another; an anchoring unit 8 secured to the backplate 2, of given width L (FIG. 3), and on which the lower ends 3a, 4a of the shoes 3, 4 rest; and a strut 9 of adjustable length limiting the degree to which the shoes 3, 4 come together.

More precisely, the invention relates to a method for assembling and adjusting such a drum brake, the overall method comprising two steps, the first step consisting in preassembling and adjusting a subassembly of the drum brake, and the second step consisting in mounting the said subassembly on the backplate.

The first step of the method itself comprises the operation consisting in:

placing the two brake shoes 3 and 4 on any horizontal surface, for example on a workbench or mounting stand, these shoes being placed with respect to one another substantially in a relative position which they adopt in the brake once mounted;

locating the adjustable-length strut 9 between the shoes 3 and 4 thus prepared;

adjusting the length of the strut 9 to a value for which the shoes 3, 4 are separated by a maximum diametral distance D which is less than the inside diameter ID of the drum; and fastening the return springs 5 and 6 to the shoes 3 and 4 by inserting them in the orifices provided for this purpose in the shoes.

This first step thus leads to the production of a subassembly of the drum brake, this subassembly comprising the shoes 3, 4, the return springs 5, 6, the adjustable-length strut 9, as well as all the components conventionally secured to the shoes, when there are any, for example the handbrake lever 11.

The first step can further comprise the operation consisting in locating between the shoes 3 and 4, at a distance from the strut 9, a removable wedge 10 the length of which is such that a stress is applied to the return springs 5 and 6. In this way, the subassembly obtained after completion of the first step can be easily handled, packed and shipped, while avoiding the risk of the return springs to be lost or the subassembly to be dismounted.

The second step of the overall method then consists in mounting this subassembly on the backplate 2 and comprises the operations consisting in:

removing the removable wedge 10;

bringing the upper ends 3*b*, 4*b* of the shoes 3, 4 to bear against the wheel cylinder 7; and bringing the lower ends 3*a*, 4*a* of the shoes 3, 4 to bear on the anchoring unit 8.

By virtue of this method, the drum brake may be mounted rapidly, without the risk of error, and is demonstrated to be completely operational after mounting.

I claim:

1. A method of assembling a subassembly for a brake of the type having a drum of given inside diameter and which comprises: a backplate; two shoes, each of which exhibits a lower end and an upper end; return springs urging the shoes toward one another; a wheel cylinder secured to the backplate and capable of moving the upper ends of the shoes away from one another; an anchoring unit of given width secured to the backplate and on which the lower ends of the shoes rest; and a strut of adjustable length limiting the degree to which the shoes come together, the assembly method comprising preassembling and adjusting the subassembly of the brake prior to assembly of said brake on the backing plate and consisting of the steps of:

placing the two brake shoes on a surface;

locating the adjustable-length strut between the shoes;

adjusting the length of the strut to a value for which the shoes are separated by a maximum diametral distance which is less than the inside diameter of the drum;

fastening the return springs to the shoes; and locating between the shoes, at a distance from the strut, a removable wedge the length of which is such that a stress is applied to the return springs.

\* \* \* \* \*